Dec. 19, 1939.   H. S. CAMPBELL   2,183,984
PROCESS AND APPARATUS FOR A FORMED MAT
Filed Nov. 8, 1935   4 Sheets-Sheet 1

INVENTOR
Hugh S. Campbell,
BY Justin W. Macklin
ATTORNEY

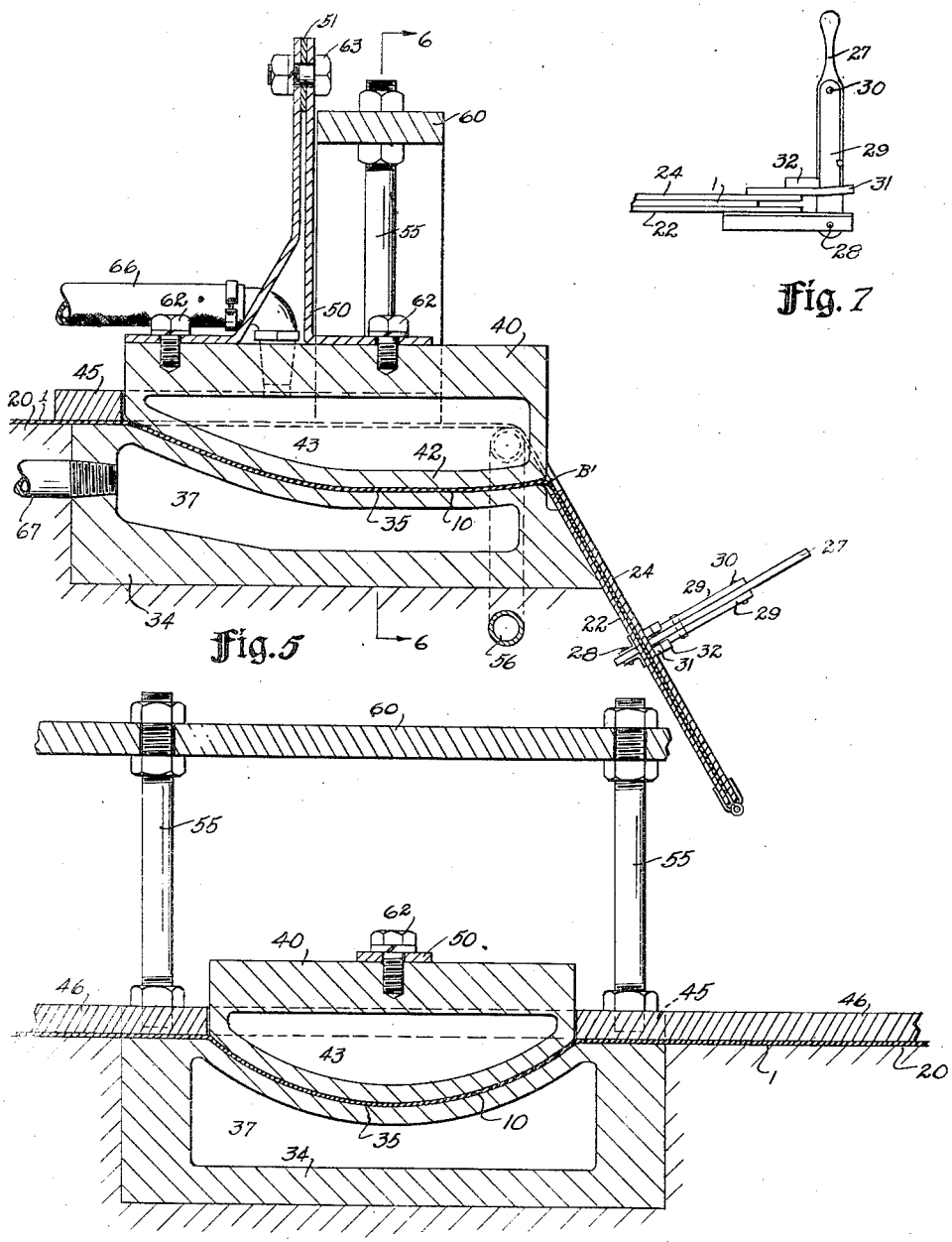

Patented Dec. 19, 1939

2,183,984

UNITED STATES PATENT OFFICE 2,183,984

PROCESS AND APPARATUS FOR A FORMED MAT

Hugh S. Campbell, Youngstown, Ohio, assignor to The Republic Rubber Company, Youngstown, Ohio, a corporation of Ohio Application November 8, 1935, Serial No. 48,892

6 Claims. (Cl. 18—19)

This invention relates to a process and apparatus for shaping or forming mats for the front compartments of automobiles so that certain irregularities in contour and particularly upwardly projecting portions around the gear boxes or casings and the like may be formed into the mat economically and effectively, after the mat has been cured in flat form.

A further object is to provide such a mat which when so shaped will permanently retain the predetermined contour, thereby fitting in the front compartment of an automobile or the like, without irregularities or undesirable wrinkling or folding of the material occurring when in place.

Another object is to provide a process and an apparatus for stretching or elongating a mat for the purpose of compensating for the differences in lengths of various parts of the mat when it is positioned in the compartment to which it has been adapted and thereby eliminating the undesirable wrinkles or buckles which would occur if such elongation did not take place.

More specifically, in certain modern automobiles the floor mat for the front compartment, that is, the driver's compartment, has its larger portion lying flat upon the floor and a substantial portion extending upward at an abrupt angle. The portion lying against the footboard may or may not have a further upward extension. An upward protuberance occurs, rising from the floor board where the transmission gear box casing projects upwardly through the plane of the floor. This is generally at the juncture between the floor and the footboard so that the bulge or protuberance occurs above the line of the intersection of floor planes, that is, it is intercepted by two planes which are at an angle to each other.

This affords a problem in the manufacture of mats which are normally molded and finished flat in the forming presses, in that when the footboard portion of the flat mat is tipped upwardly, any previously formed bulge projecting upwardly from the area of both the floor board portion and the footboard portion will naturally be distorted when the two portions of the mat no longer lie in a common plane, but the footboard portion rises in an angle from the other.

Heretofore comparatively expensive mold and even special press equipment have been resorted to for molding and permanently curing the shape of the mats so that they will lie smoothly over the two plane surfaces and over the protuberances, such as the projecting gear casing or the like.

A more specific object of the present invention, therefore, is to provide an apparatus and process by which mats may be molded and cured in flat condition, that is, in a common plane; and thereafter the crease or bend in the mat may be made by placing the body of the mat in two planes corresponding to the position which it will eventually have in the front compartment; and then by the application of forming members and heat, the bulge may be formed and given a final set so that the mat is permanently and accurately distorted to its predetermined and final contour.

Another specific object of the present invention is to provide a process and an apparatus for permanently deforming a mat to fit the irregular contours occurring in the compartment of an automobile, and during such deformation process to elongate the area of the mat to compensate for the increased areas necessary in covering the contours smoothly.

Another specific object of this invention is to provide a process and apparatus for elongating and permanently deforming the mat for the purpose of covering smoothly with the mat other irregular contours in the floor sections, as an example, at the intersection of the floor board with the door sills of an automobile.

Further objects include the provision of processes, the steps of which may be simple and efficient, and apparatus for carrying out these steps which may be conveniently and rapidly operated whereby the mats requiring protuberances or bulges may be formed as desired.

The above and other objects will become more apparent in the following specification which relates to the drawings, illustrating a preferred and practical embodiment of an apparatus carrying out my invention, the essential characteristics being summarized in the claims. It is to be understood that various modifications may be made without departing from the spirit and scope of my invention except as defined in the appended claims.

In the drawings, Fig. 1 is a plan view of a floor mat with which the present invention is concerned.

Fig. 5 is an enlarged transverse section taken substantially on the line 5—5 of Fig. 4.

Fig. 6 is a section taken substantially on the plane indicated on the line 6—6 of Fig. 5.

Fig. 7 is a detail of the clamping member.

Figure 2:
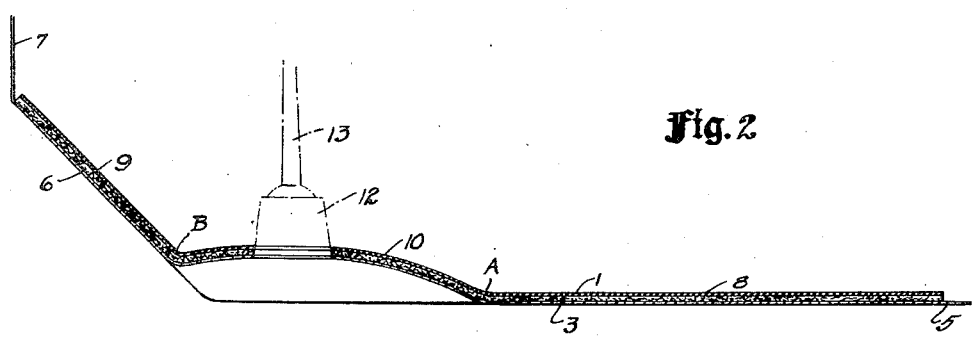
Fig. 2 is a vertical section of the same.
Figure 3:
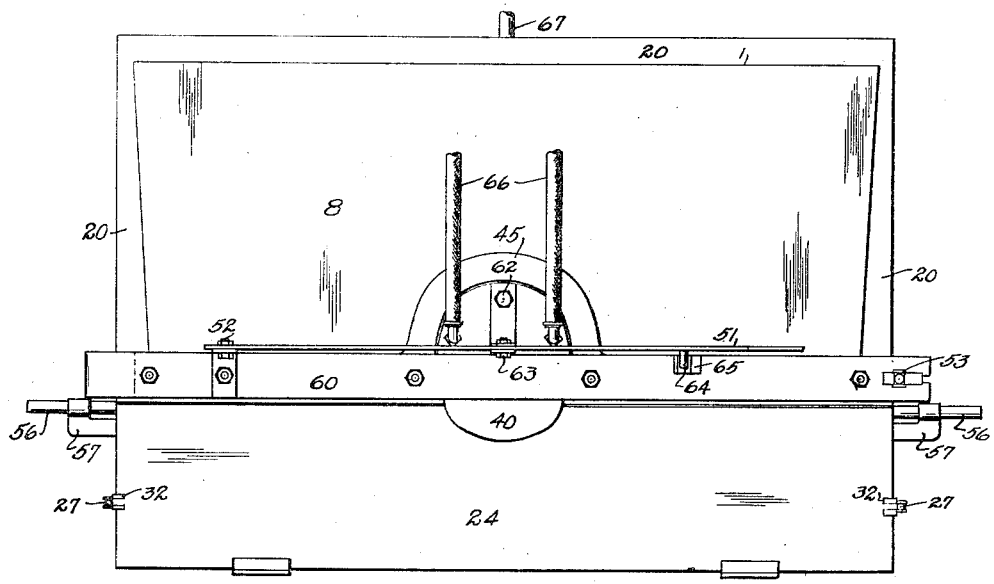
Fig. 3 is a plan view of an apparatus for forming the bend and bulge in the mat.
Figure 4:
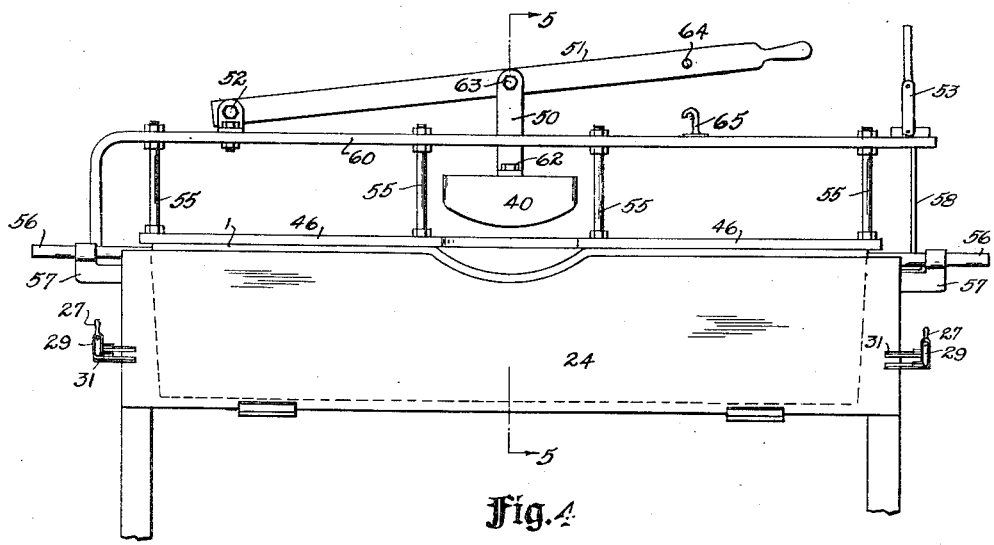
Fig. 4 is a front elevation of the same apparatus.

Describing the parts by the use of reference characters, the floor mat itself is shown as comprising an upper layer or main body of rubber 1, Fig. 2, which may carry the usual decorations, marginal trim, or the like, molded in the surface thereof. A commonly used form of such a mat employs a felt base or bottom which may or may not be pasted or vulcanized or otherwise secured to the body 1. It is illustrated at 3 in Fig. 2. The floor of the automobile may be of sheet steel boards or the like. For illustration, I have shown a plate 5 having an upwardly extending footboard portion 6, from which rises the front wall 7, and also a mat having a floor board portion designated as 8 while the footboard portion 9 rises as shown at the usual angle of the footboard to the floor.

An upward protuberance is shown at 10 as rising from the floor board curving forwardly and joining the portion 9. This protuberance is also curved laterally so that it is in general the shape of a truncated portion of a sphere.

Indicated in dot and dash lines is the usual gear shift lever boss or socket 12 having the shift lever 13 rising from the gear shift box or casing (not shown), but which projects upwardly past the plane of the floor members 5 and 6, and occasions the protuberance or bulge 10.

Figure 8:
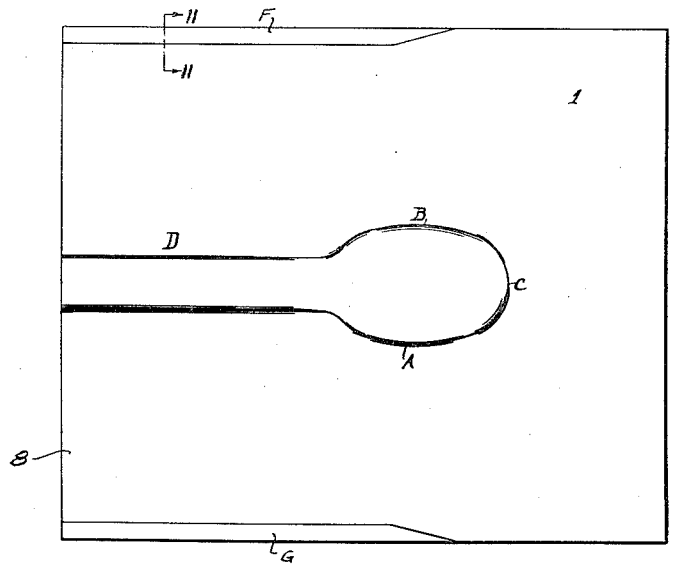
Fig. 8 is a plan view of a floor mat for the front compartment of an automobile illustrating the formed portion and the area elongated.

It will be seen that if the mat be formed flat and then laid over the floor, footboard and bulge at 10, as the portion 9 of the mat is placed in an angular position with the floor portion 5, it will shorten the distance between the points A and B of the mat, thus tending to cause wrinkling or folding of the material of the mat. In the transverse direction the material of the mat placed over the protuberance of the gear casing would be suspended and would not fit closely to the floorboard at the zones indicated at C, adjacent the bulge. Likewise, in covering other irregularities of contour in the floor sections, illustrated in Fig. 8, the mat would not fit closely to such projections as at D, F and G.

Figure 1:
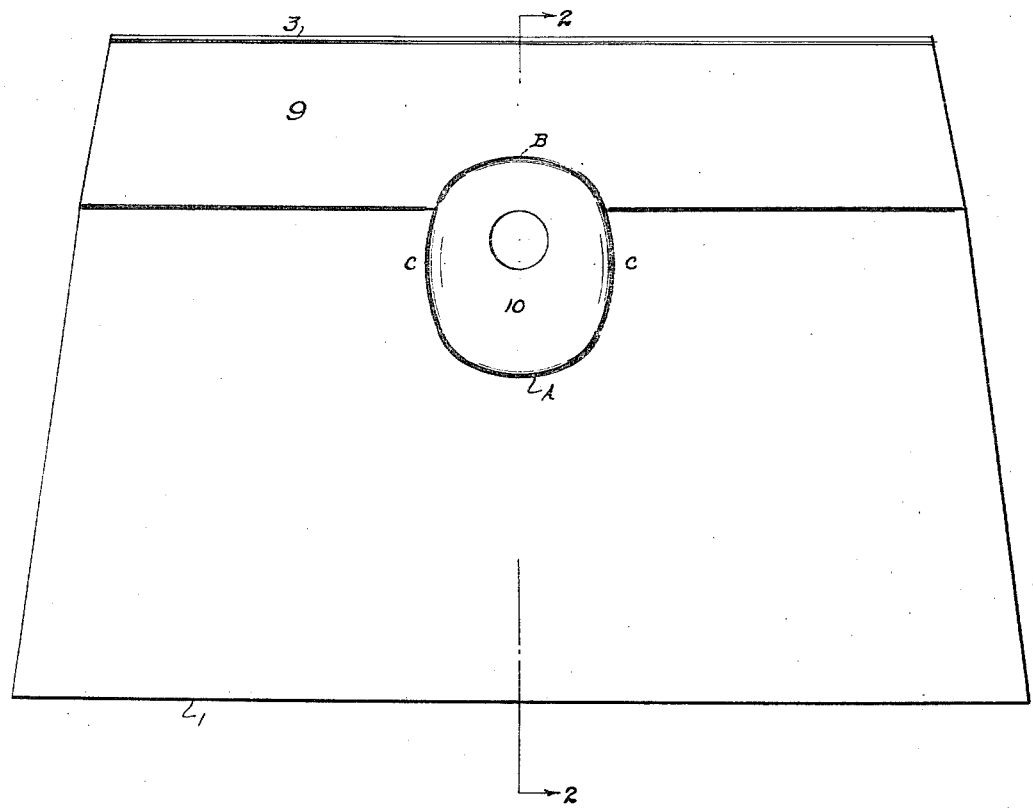
Figure 9:
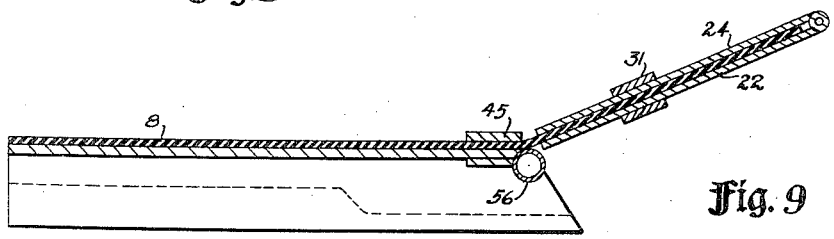
Fig. 9 is a diagrammatic section illustrating the position of the forming apparatus having the mat placed thereon but not clamped.

To overcome these difficulties, including the fitting of the mat closely to the projections from the floor sections, the mat is first cured by the usual process for such rubberized substances. In obtaining the stretching and elongating and the upward protuberance, as illustrated in Fig. 1, the mat is positioned with its floor board portion in one plane and its foot or normally rising portion in another plane. This is illustrated in Fig. 9. The mat is then securely clamped in said angular position, and the apron portion of the apparatus is then dropped to the desired position required for usage in the front compartment.

Figure 10:
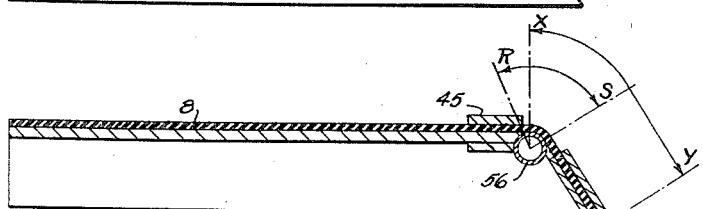
Fig. 10 is a diagrammatic section taken of the forming apparatus illustrating the position of the mat after elongation of a specific area of the mat has taken place.

By this change in the angular position of the apron, the area between the clamps, as illustrated in Fig. 10, is stretched and elongated to such an extent as to fit the contour of the footboard portion with respect to that of the floor board. The distance between the perpendiculars R and S illustrates the amount of stretching and elongating of the mat and this amount represented is distributed along the mat area between the perpendiculars X and Y.

Thereafter I apply pressure and heat to forming members which force the material into the contour of the bulge 10 while the portions 8 and 9 are held at the angle shown. By this application of heat to the areas of the mat, the material of the mat is given a permanent set. This heat application, however, is very short in period of time and does not effect further or detrimental vulcanization of the rubber composition or the rubber layer 1 of the mat is made.

To carry out my process, I prefer to provide an apparatus comprising essentially a table portion 20 to which is hinged an apron member 22, arranged to swing about a line approximately coincident with the fold line between the floor board portion and the footboard portion of the mat.

Rigid with the frame plate or table 20 I may provide a mold member 34 having its upper face shaped to form a cavity 35 located and adapted to form the bulge portion 10 of the mat illustrated in Fig. 1. A mold member 40 having a convex face 42 complementary to the concave face 35, is supported and operated through supporting member 50 attached to the upper face of the mold member 40 through the medium of studs as indicated at 62. The operating arm 51 for the mold member 40 is pivoted to the supporting member 50 by means of a bolt as at 63.

The operating arm is movably affixed to the bridging element 60 at 52, which bridging element is in turn fastened to table clamping member 46 through the medium of bolts as illustrated at 55. The molding member 40 is held in a heating and bending position on to the mat surface by a hook member as at 65, being placed in a holding position on to a pin as at 64 which is fastened to the operating arm 51. The table clamping member 46 through the bridging element 60 is movably supported to the table portion 20.

The clamp for holding the plate 24 to the apron 22 may comprise simply a handle member pivoted at 28 to members secured to the under side of plate 22, one or more swinging blocks 29 pivoted to the handle 27 at 30, and as the handle 27 is swung upward the lower ends of the blocks engaging the stop 32 are brought into alignment with the handle, causing a downward pressure upon extension members 31 between which the handle passes.

To hold the table clamping member 46 in a clamping position, I may provide a clamping means composed of a clamping device 53 as illustrated in Fig. 7, which may be pivoted to the table portion 20, through the linkage as at 58.

Steam may be brought to the cavities 37 and 43 through any suitable conduit, such as 66 and 67. It is also supplied to the line 56, which is shown as being in contact with the mat at the position of the fold, whereby it gives some heat to effect a set of the rubber or like material at this fold. Obviously the steam line 56 should be arranged so that it does not interfere with the contour or blocks forming the bulge of the mat. It is shown as passing beneath the block 34. (See Fig. 5.)

For convenience in the arrangement shown, the line may function as a hinge for the plate 22, the plate 22 being attached thereto by brackets as at 57.

The apparatus as above described may be adapted for the formation of projections and elongation of areas of the mat by making such changes in the apparatus as in the molding members and clamping members whereby the described process may then be followed.

In operation, assuming that the apron or plate 22 is raised to an angle preferably about level with the table 20 or slightly raised above this position, the mat 1 is then placed on the table 20 and the apron 22, as illustrated in Fig. 9. The plate 24 is then brought into its covering and clamping position and there held by the clamp members 27.

The mat may be of the form having a felt backing as stated, in which case the felt is faced upwardly while the rubber or the like surface forming the top of the mat is faced down toward the table or apron. The mats may be entirely made of composition, such as rubber. In any event, however, the top of the mat is faced downwardly on the table, having the arrangement of bulge forming molds shown, although quite obviously this arrangement may be altered or reversed without departing from the spirit of my invention.

The clamping bar 45—46 is then brought tightly into engagement with the mat and there clamped by the use of the hand clamp 53. The apron may be then dropped to the position shown in Fig. 5, and the male mold member 49 for the bulge is then firmly pressed into its companion 34 and is clamped in its downward position by a suitable clamp or hook, as indicated at 65.

The parts being brought to this position, the respective mat areas are elongated and stretched, as indicated by Figs. 5 and 10, to fit the contours of the floor sections which the mat areas are to cover. The heat is applied to the mold members 34 and 49 for the desired period to give a set to the material of the mat. At the same time, a set is given to the distorted portion along the pipe 56, although this is not essential to the formation of the bulge itself.

The heating condition continues for a period during which the distortion of the mat at the bulge is given a permanent set in the shape of the mold members, but without further vulcanizing or otherwise injuring the material of the mat; likewise for the distorted area along the pipe 56.

The mat is then removed after the expiration of this heating and bending period and is then placed upon an open form or support corresponding to the desired resultant condition of the mat and is allowed to remain on this form until the mat surface is cool, this form being merely a structure corresponding to the various contours of the surface and allowing for air circulation to penetrate from the under side to the outer surface of the mat.

Figure 11:
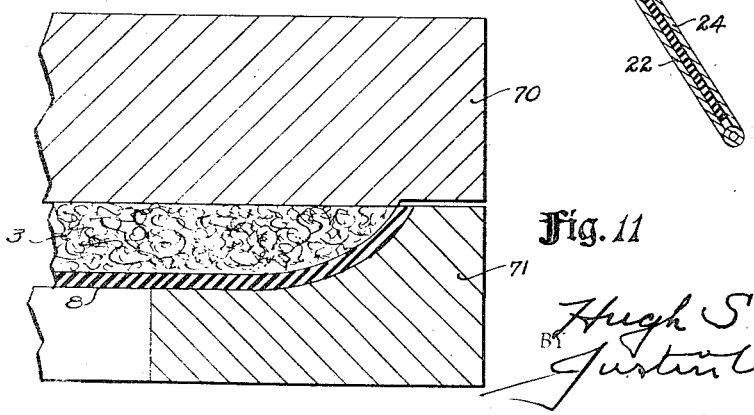
Fig. 11 is a diagrammatic section taken along the line 11—11 of Fig. 8 illustrating another usage to which the apparatus may be adapted in the formation of the irregular contour of the floor section existing adjacent to the door sills of an automobile.

To properly construct the mat to fit the various contours and projections from the floor sections, such may be formed by using a similar process as explained above. As an example, rounded or curved edges may be necessary in the case of fitting the mat properly up against the door sills. Deformation of the mat to fit these conditions is illustrated diagrammatically in Fig. 11, and this is accomplished by mold members 70 and 71.

This method of permanent distortion of the mat has been so designed and constructed as to require a minimum of time and also to permit an operator to efficiently operate a number of these heating and bending machines at one time.

The particular embodiments and processes described are not intended to limit the scope of my invention since many deviations and modifications may be made for the formation of other irregular contours in mat construction apart from those used in automobiles. This is illustrated by the scope of the appended claims.

Having thus described my invention, what I claim is:

1. In a method of contouring elastic thermally moldable sheet material wherein the sheet is bulged but with resultant gather of excess material in the sheet in and adjacent the bulged portion, and, by the application of heat to the bulged portion, the bulge is rendered permanent, the steps of stretching a portion of the sheet of material in and adjacent the portion to be permanently bulged preparatory to the bulging operation, and bulging the last mentioned portion of the sheet of material while maintaining said prestretched portion in stretched position, whereby stock which normally would gather as excess in the bulged sheet is reduced.

2. In a method of contouring prevulcanized rubber sheet material wherein a bulge is formed with resultant gather of excess material in the sheet at or adjacent the bulge, and, by the application of heat to the sheet, said bulge is rendered permanent, the steps of stretching a portion of the material in and adjacent the portion to be bulged, preparatory to the bulging operation, and bulging the last named portion while maintaining said prestretched portion in stretched position, whereby stock which normally would gather as excess at or adjacent the bulge is reduced.

3. The method of contouring a mat of elastic thermally moldable sheet material to provide relatively forward and rearward portions, each of which is in the form of a generally plane surface intersecting the other, and a bulged portion extending from one of the first mentioned portions across the intersection to the other in a manner such that the distance, measured along the bulge, between the forward and rearward limits of the bulge is less than the distance between said limits, measured along the plane surfaces of said portions, comprising the steps of disposing said forward and rearward portions in intersecting planes and stretching the material in and adjacent the portion to be bulged, maintaining the sheet of material in said position while bulging the material at the stretched portion, and applying heat to the material to provide a permanent bulge and contour of the character described.

4. The method of contouring a mat of thermally moldable sheet material to provide relatively forward and rearward portions in the form of generally plane surfaces intersecting each other and with a bulged portion extending from one of the first mentioned portions across the intersection to the other in a manner such that the distance between the forward and rearward limits of the bulge, measured along the bulge, is less than the distance between said limits, measured along the plane surfaces of said portions, and comprising the steps of causing the forward and rearward portions to lie in intersecting planes, and stretching, in a direction forwardly and rearwardly of the sheet, a localized portion of the material, which localized portion lies partly in the forward portion, across the intersection, and partly in the rearward portion of the sheet, all preparatory to the bulging operation, and, while the forward, rearward and localized portions are in the condition described, bulging the sheet of material at the prestretched localized portion, and, by the application of heat to the sheet, rendering the bulge and contour of the character described permanent.

5. An apparatus for contouring a flat sheet of thermally moldable material to provide two portions in intersecting planes with a bulge therebetween and extending from one portion to the other across the intersection, and comprising a support for the sheet of material, said support having two supporting portions pivotally mounted for relative angular movement to dispose the portions in predetermined intersecting planes, the pivotal axis of said portions being spaced from the intersection of said intersecting planes, said portions of the support having their adjacent margins of a shape such as to define a common opening in their supporting surfaces, which opening is adapted to receive a mold means, means for clamping a sheet of material on the portions in spaced relation to said opening, whereby a sheet of material may be clamped to said portions while the sheet is in overlying relation to the portions and opening, and mold means movable into said opening from that side of the supporting portions which are opposite from the pivotal axis when the portions are disposed in said intersecting planes for bulging a portion of the material which lies within the limits of the opening.

6. An apparatus for contouring a flat sheet of elastic thermally moldable material to provide a mat having portions in the form of generally plane surfaces angularly disposed relative to each other and with a bulge extending from one of said portions, across the intersections of the portions, into another of said portions, and comprising table portions arranged to lie in intersecting planes, the adjacent margins of the table portions being shaped to define a common opening in their supporting surfaces, which opening is adapted to receive a mold means, supporting means supporting said table portions for relative movement by which their adjacent margins may be moved toward and away from each other, clamping means cooperable with the table portions for clamping portions of the sheet of material in fixed relation to the associated table portions outside of a localized portion of the sheet of material which overlies the opening, whereby said relative movement of the table portions with respect to each other stretches the localized portion of the sheet and moves the other portions of the sheet to the positions at which the said other portions of the sheet are to be permanently set relative to each other, and mold means movable into said common opening while the table portions lie in said intersecting planes for permanently contouring the localized stretched portion of the sheet of material while the localized stretched portion of the sheet is in stretched position.

HUGH S. CAMPBELL.